United States Patent
Gilder et al.

(10) Patent No.: US 11,966,437 B2
(45) Date of Patent: Apr. 23, 2024

(54) COMPUTING SYSTEMS AND METHODS FOR CATALOGING, RETRIEVING, AND ORGANIZING USER-GENERATED CONTENT ASSOCIATED WITH OBJECTS

(71) Applicant: Google LLC, Mountain View, CA (US)

(72) Inventors: Ariel Gilder, Fair Lawn, NJ (US); Piotr Zielinski, New Providence, NJ (US); Alexandros Panagopoulos, Leonia, NJ (US)

(73) Assignee: GOOGLE LLC, Mountain View, CA (US)

( * ) Notice: Subject to any disclaimer, the term of this patent is extended or adjusted under 35 U.S.C. 154(b) by 177 days.

(21) Appl. No.: 17/314,345

(22) PCT Filed: Jan. 31, 2019

(86) PCT No.: PCT/US2019/016089
§ 371 (c)(1),
(2) Date: May 7, 2021

(87) PCT Pub. No.: WO2020/096636
PCT Pub. Date: May 14, 2020

(65) Prior Publication Data
US 2022/0035856 A1 Feb. 3, 2022

Related U.S. Application Data

(60) Provisional application No. 62/756,857, filed on Nov. 7, 2018.

(51) Int. Cl.
*G06F 16/58* (2019.01)
*G06F 16/55* (2019.01)
(Continued)

(52) U.S. Cl.
CPC .......... *G06F 16/5866* (2019.01); *G06F 16/55* (2019.01); *G06F 16/583* (2019.01); *G06F 16/587* (2019.01); *G06N 3/04* (2013.01)

(58) Field of Classification Search
CPC .... G06F 16/5866; G06F 16/55; G06F 16/583; G06F 16/587
(Continued)

(56) References Cited

U.S. PATENT DOCUMENTS 9,069,795 B2 * 6/2015 Atsmon ................. G06F 16/51
9,104,704 B2    8/2015 Wenger
(Continued)

FOREIGN PATENT DOCUMENTS

WO    WO 2018/013982    1/2018

OTHER PUBLICATIONS

International Search Report for PCT/US2019/016089 dated May 17, 2019, 2 pages.
(Continued)

*Primary Examiner* — Kimberly L Wilson
(74) *Attorney, Agent, or Firm* — DORITY & MANNING P.A.

(57) ABSTRACT

The present disclosure provides computing systems and methods for cataloging, retrieving, and/or organizing user-generated content associated with objects. Aspects of the disclosure are directed to a systems and methods which utilize computers to enable users to interact with libraries of user-generated content associated with cataloged objects. For example, a user can capture one or more images of a real-world object, label or otherwise annotate the object with various types of user-generated content and organize the object and its associated content into one or more libraries. The user-generated content can then be provided to other users upon the receipt of images of the same object or an object displaying similar features.

19 Claims, 7 Drawing Sheets

(51) Int. Cl.
    *G06F 16/583*    (2019.01)
    *G06F 16/587*    (2019.01)
    *G06N 3/04*      (2023.01)

(58) Field of Classification Search
    USPC .......................................................... 707/722
    See application file for complete search history.

(56) References Cited

U.S. PATENT DOCUMENTS

| | | | |
|---|---|---|---|
| 9,338,589 B2* | 5/2016 | Loxam | G06T 11/60 |
| 11,095,869 B2* | 8/2021 | Holzer | H04N 13/189 |
| 2010/0002941 A1 | 1/2010 | Fonseca et al. | |
| 2015/0139610 A1* | 5/2015 | Syed | G11B 27/34 |
| | | | 386/241 |
| 2017/0300495 A1* | 10/2017 | Sharifi | G06F 16/583 |
| 2017/0351713 A1* | 12/2017 | Chamberlain | G06F 16/5838 |
| 2019/0205962 A1* | 7/2019 | Piramuthu | G06V 20/20 |
| 2020/0026949 A1* | 1/2020 | Alcock | G06V 10/40 |

OTHER PUBLICATIONS

International Preliminary Report on Patentability for Application No. PCT/US2019/016089, mailed May 20, 2021, 10 pages.
Chinese Search Report Corresponding to Application No. 2019800783229 on Jan. 26, 2024.

* cited by examiner

COMPUTING SYSTEMS AND METHODS FOR CATALOGING, RETRIEVING, AND ORGANIZING USER-GENERATED CONTENT ASSOCIATED WITH OBJECTS

PRIORITY CLAIM

The present application claims the right of priority under 35 U.S.C. § 371 to International Application No. PCT/US2019/016089 filed on Jan. 31, 2019, which is based on and claims priority to U.S. Provisional Application No. 62/756,857 having a filing date of Nov. 7, 2018. Applicant claims priority to and the benefit of each of such application and incorporate all such application herein by reference in its entirety.

FIELD

The present disclosure relates generally to image recognition and data storage. More particularly, the present disclosure relates to computing systems and methods that provide tools to retrieve and catalog user-generated data that includes images.

BACKGROUND

Computing technologies, including image classification and data management, have improved greatly because of advances in machine learning. However, a stumbling block in image recognition is obtaining training data for scarce or rare objects. This problem is enhanced by the complexities of real-world environments that can continuously change. Current tools for image recognition often rely on learning models that are static instead of models that may be continually updated with new data. This provides a challenge for the development of augmented reality applications and other tools that need to process current image data associated with a dynamically changing world. While static models can provide a general user experience, there has yet to be a solution for customizing user interaction with dynamic image data.

SUMMARY

Aspects and advantages of embodiments of the present disclosure will be set forth in part in the following description, or can be learned from the description, or can be learned through practice of the embodiments.

One example aspect of the present disclosure is directed to a computing system for cataloging and retrieving user-generated data associated with objects. The computing system includes one or more processors and one or more non-transitory computer-readable media that collectively store instructions that, when executed by the one or more processors, cause the computing system to perform operations. The operations include receiving a dataset that comprises one or more images captured by a user that depict an object. The operations include processing, using an artificial neural network, the dataset to generate an embedding associated with the object. The operations include accessing one or more libraries of a plurality of libraries of user-generated content, wherein each of the plurality of libraries comprises one or more cataloged embeddings respectively associated with one or more cataloged objects. Each cataloged embedding has been generated from one or more images of the associated cataloged object captured by one or more other users. One or more items of user-generated content are associated with each cataloged object. The one or more libraries are a subset of the plurality of libraries. The operations include identifying, based at least in part on a comparison of the embedding with one or more cataloged embeddings included in the one or more libraries, a closest cataloged embedding of the one or more cataloged embeddings included in the one or more libraries. The operations include providing, for presentation to the user, at least one item of user-generated content that is associated with the closest cataloged embedding of the one or more cataloged embeddings included in the one or more libraries.

Another example aspect of the present disclosure is directed to a computer implemented method for cataloging and retrieving user-generated data associated with objects. The method includes receiving, by one or more computing devices, a dataset that comprises one or more images captured by a user that depict an object. The method includes processing, by one or more computing devices using a neural network, the dataset to generate an embedding associated with the object. The method includes accessing, by the one or more computing devices, one or more libraries of a plurality of libraries. Each of the plurality of libraries includes one or more cataloged embeddings respectively associated with one or more cataloged objects. Each cataloged embedding has been generated from one or more images of the associated cataloged object. One or more items of content are associated with each embedding. The one or more libraries are a subset of the plurality of libraries. The method includes associating, by one or more computing devices, the embedding with one of the cataloged objects. Associating the embedding with one of the cataloged objects produces a new cataloged embedding that is accessible by the one or more computing devices.

Another example aspect of the present disclosure is directed to a computing system. The computing system includes one or more data storage devices that store a plurality of libraries of user-generated content. Each of the plurality of libraries includes one or more cataloged embeddings respectively associated with one or more cataloged objects. Each cataloged embedding has been generated from one or more images of the associated cataloged object captured by one or more users. One or more items of user-generated content are associated with each embedding. The computing system includes one or more computing devices that implement a user-generated content platform that: receives imagery of an object from a client; uses an artificial neural network to generate an embedding for the object; searches one or more of the plurality of libraries to identify a cataloged object that has a cataloged embedding that is closest to the embedding for the object; and serves to the client at least one item of user-generated content associated with the identified cataloged object.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1A:
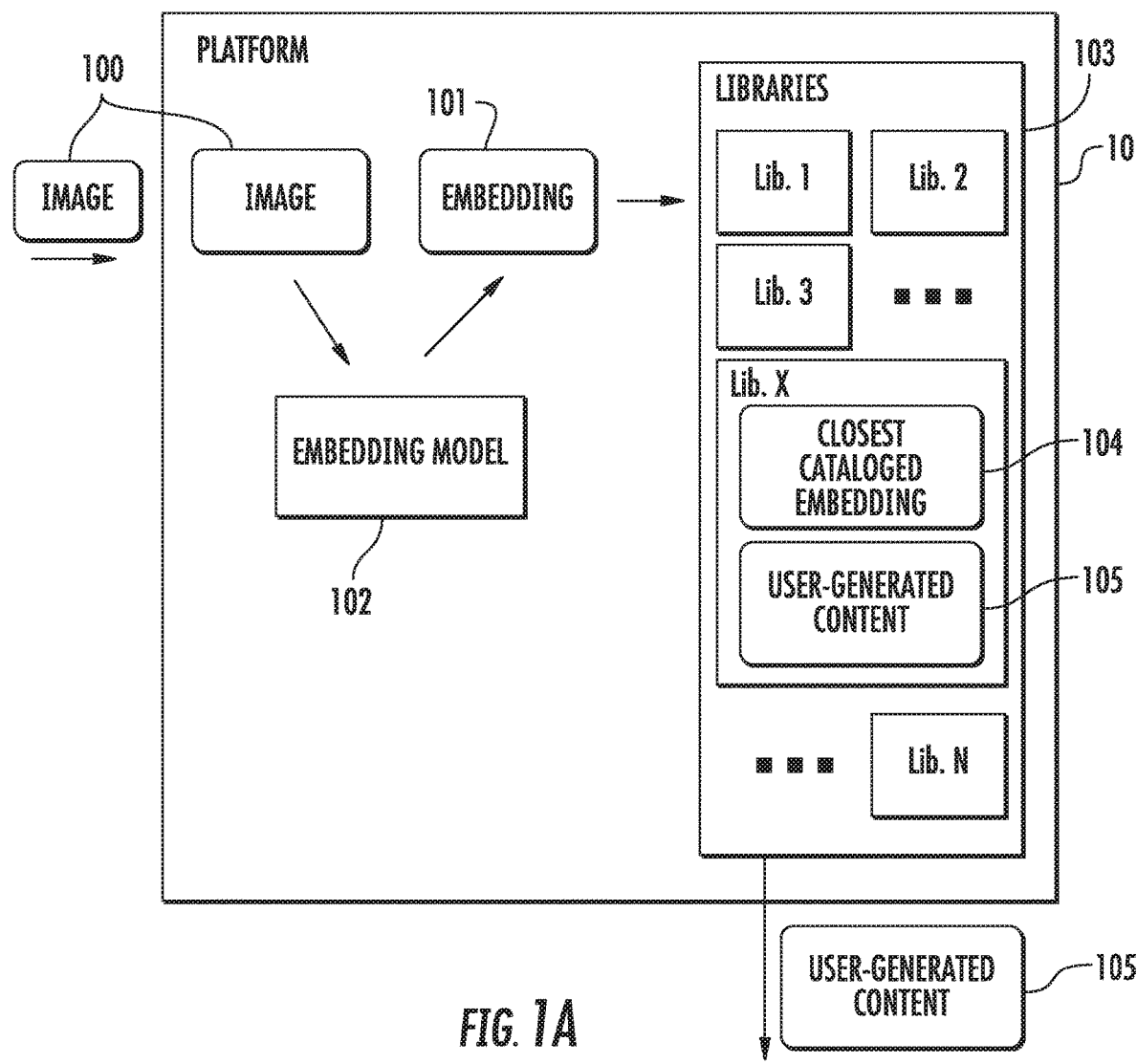
FIG. 1A illustrates a workflow diagram of an example process for retrieving user-generated content according to example embodiments of the present disclosure.

Generally, the present disclosure is directed to image recognition and management of user-generated content associated with objects. An embodiment of the disclosure is directed to a computing system that enables users to interact with libraries of user-generated content associated with cataloged objects. For example, a user can capture one or more images of a real-world object, label or otherwise annotate the object with various types of user-generated content and organize the object and its associated content into one or more libraries. In particular, an embedding model such as an artificial neural network can be used in embodiments to generate a cataloged embedding for each cataloged object based on the images of such object. The one or more libraries may be shared with other users and the computing system can enable the other users to receive the user-generated content based on visual recognition of the corresponding object.

As an example, a first user can catalog a particular object and content into a library. Thereafter, a second user can capture images of the particular object while the user is located near the object. The computing system can use the embedding model (e.g., artificial neural network) to process the image(s) of the object to generate an embedding associated with the object. The computing system can access one or more libraries from a set of libraries of user-generated content, including, for example, the library in which the first user cataloged the particular object. The computing system can identify, based at least in part on a comparison of the embedding with one or more cataloged embeddings included in the one or more libraries, a closest cataloged embedding of the one or more cataloged embeddings included in the one or more libraries. The computing system can provide, for presentation to the second user, at least one item of user-generated content that is associated with the closest cataloged embedding of the one or more cataloged embeddings included in the one or more libraries. In particular, the computing system can recognize the particular object and provide the associated content to the second user.

Thus, by capturing imagery of an object and providing it to the computing system, the second user can receive the user-generated content that was previously associated with the object in one of the libraries by the first user.

To provide an example for the purpose of illustration, an art enthusiast can go to a museum and approach a painting. The art enthusiast can take photograph(s) of the painting and also generate some content associated with the painting. For example, the user-generated content can include some notes entered by the art enthusiast about a brush technique used by the artist. The photograph(s) of the painting and the user-generated content can be supplied to the platform and the platform can use an artificial neural network to generate an embedding for the painting based on the photograph(s). The embedding and the user-generated content can be associated with each other and stored within one or more libraries. For example, the embedding and the user-generated content can be stored in a particular library that is associated with the museum. Thereafter, an art student can go to the museum and begin using the platform. In particular, the art student can select the library associated with the museum for use. The student can notice the painting and wish to receive additional information. To do so, the student can capture one or more images of the painting with her device (e.g., smartphone). The platform can recognize the painting based on the images captured by the student. In particular, the platform can use the neural network to generate an embedding based on the images captured by the student and can match the generated embedding to the cataloged embedding generated based on the images captured by the art enthusiast. The platform can access the user-generated content associated with the painting in the library (e.g., the art enthusiast's notes about the brush technique) and provide them to the art student. In instances where multiple items of content are associated with the painting, the platform can generate a list of organized content items and allow the user to choose a customized experience such as reviewing comments, viewing similar paintings, or listening to a narrative.

More particularly, aspects of the present disclosure are directed to an object recognition and content provisioning platform that enables the cataloging and retrieval of user-generated content associated with objects through the use of visual object recognition and object content libraries. In an embodiment to catalog an object or to receive content associated with an object, a user can capture one or more images of the object and then provide a dataset that includes the images to the platform. In some embodiments, the user can indicate whether she is attempting to catalog an item or to receive content associated with the item, and the platform can process the dataset accordingly.

As an example embodiment, to obtain the images of the object, the user can operate a camera in her device (e.g., smartphone) to capture discrete images of the object. The user can then select the images from a gallery and provide them to the platform. As another example embodiment, the dataset can include a video stream. In some embodiments, the video stream can be processed (e.g., to recognize a depicted object) in real time as the video stream is captured. Thus, in certain embodiments, the user may not be required to actually capture distinct images of the object (e.g., by operating a shutter control to capture images which can be stored to a photo gallery), but instead may simply manipulate the device (e.g., smartphone or other image capture device) so that the object of interest is located within a field of view of the device. In some embodiments, the video stream can be processed at least every second or according to other amounts of time.

In any of the above embodiments, the platform can receive the dataset from the user and can process the dataset using an embedding model to generate an embedding for the depicted object. As an example embodiment, the embedding model can be an artificial neural network such as, for example, a convolutional neural network. The embedding model can be trained (e.g., via a triplet training scheme) to produce embeddings for objects in an embedding dimensional space, where a magnitude of a distance between two embeddings for two objects is inversely correlated with a similarity between the two objects. In some embodiments, the platform can include a single embedding model while in other embodiments multiple different embedding models can be used. For example, different embedding models can be used which are respectively trained to be specific to different types, domains, or classes of objects. As one example, the platform may use a first embedding model for general objects but a second, specialized embedding model for food or food dishes. In some implementations, an embedding model for a particular library can provided by an owner of the library and/or specific to that library.

In any of the above embodiments, a plurality of images of the object can be used to generate the embedding for the object. For example, in some of such implementations, the platform can use the embedding model to generate a respective proto-embedding for each of the images. The platform can aggregate the proto-embeddings for the plurality of images to generate the embedding associated with the object. For example, an average of some or all the proto-embeddings can be used as the embedding for the object. Aggregation of proto-embeddings generated from multiple images can be beneficial in scenarios where the images depict a cluttered scene in which only one of the objects is the object of focus and/or scenarios where the object is non-uniform and only different views of the object provide different information.

In embodiments that include the user or platform attempting to catalog the object, the produced embedding and/or one or more items of user-generated content (examples of which are described further herein) can be added to one or more object content libraries. For embodiments of the disclosure, the libraries can be public libraries or private libraries. The libraries can be specific to a single user or can be shared among a number of users. In some embodiments, libraries can be specific to a particular place (e.g., a museum) or specific to a particular subject (e.g., horror movies or gardening), or can be a general collection of cataloged objects. The libraries can be stored locally on the user's device, shared with one or more other devices, and/or uploaded to a centralized database for access by other devices. As described further herein, libraries can be curated, combined, shared, synthesized, transferred, or managed in other manners. Thus, aspects of the present disclosure enable users to generate or supplement various different libraries that catalog objects based on user-supplied imagery and further associate and store user-generated content with such cataloged objects.

In certain embodiments of the disclosure, cataloging the object can also include applying a spam filter. In these cases, a first subset of the one or more cataloged embeddings can be used to identify a quality and a second subset can be used to identify a relevance; and the quality and relevance can be used to produce the content item. As an example, the first subset of the one or more cataloged embeddings may include embeddings generated from datasets including one or more spam classes such as: low-light, high exposure, low resolution, out of focus, nudity, and inappropriate language.

In cases where the spam filter identifies poor quality, the content item can include a prompt notifying the user of association with the one or more spam classes.

In embodiments where the user is attempting to receive content associated with the object rather than catalog the object, then the platform can access one or more libraries to attempt to recognize the object and retrieve content associated with the object. In particular, each library can include one or more cataloged embeddings respectively associated with one or more cataloged objects. In some embodiments, some or all of cataloged embeddings have been generated from one or more images of the associated cataloged object captured by one or more other users. In addition, one or more items of user-generated content can be associated with each cataloged object in each library. Thus, in certain embodiments, a specific subset of all possible libraries can be accessed and used to recognize the object and/or obtain content associated with the object.

In some embodiments, the specific libraries that are accessed can be selected or otherwise identified based on user input. For example, the user input can be received as part of or currently with the dataset or can be received (e.g., in response to a prompt) when the platform is ready to access libraries.

In some embodiments, the accessed libraries can be downloaded to the user's computing device. In some instances, the user can select the libraries to download. In other instances, the libraries are downloaded using information from the dataset without a user input.

In some embodiments, access permissions can be associated with the libraries. In particular, each of the plurality of libraries and/or each cataloged embedding contained therein can be associated with or owned by a particular user. The user can control a set of access permissions for the respective library or embedding that such user owns. In these embodiments, accessing the one or more libraries of the plurality of libraries of user-generated content cam include accessing only libraries that the user who is seeking content has been granted permission to access.

In certain embodiments, the libraries can be organized using a data management system that provides a hierarchy. As an example, the hierarchy can include a learning algorithm to optimize grouping cataloged embeddings generated from images that display similar features or objects. In this manner, the learning algorithm groups embeddings into libraries so that each library includes a subset of the cataloged embeddings that are similar in various characteristics (e.g., location, subject matter, object class, etc.). Further, the data management system can include library metadata that provides an average library embedding describing common features present in the cataloged embeddings associated to a library. Upon receiving a newly generated embedding, the data management system can determine the closest library using at least a comparison of the embedding to the average library embedding.

In some embodiments, a second library metadata that includes an interlibrary similarity can also be used to determine the closest library. The interlibrary similarity can be used to group libraries into a collection. As an example, the data management system could include a collection for animals which includes libraries devoted to cats, dogs, horses, mice, and pigs; a collection for food; and a collection for art. Upon receiving an image of a cat, the data management system can process the image to generate an embedding and can compare the embedding to an average library embedding. If the average library embedding is associated with a library containing images of different pasta, the dissimilarity would indicate that it is not the closest library. By comparing the embedding to one average library embedding from each collection, an initial rough filter can determine the closest collection; and further comparison of each average library associated with the closest collection provides a fine filter to determine the closest library. In some implementations, similar search techniques can be used to search for the closest cataloged embedding within a set of libraries.

Generally, a library can provide a grouping for cataloged embeddings that display a similar feature as well as the user content associated with the embeddings. In some cases, a library can be generated by a user. For example, each user could generate a personal library that includes content the user has submitted to the computing systems described. As the user submits new content, their personal library could update to include the new content. In some cases, a library can be generated by the computing system using an algorithm. For example, a learning algorithm could be used to associate embeddings with similar features into a library. In cases that use an algorithm to generate the library, the similar features can be derived from data that includes the image(s) of the object and/or non-image data such as object location or the embeddings themselves. These cases should not be viewed as mutually exclusive, as such, libraries can be generated using a variety of techniques that can include user input, programmed algorithms, or a combination of both.

Having obtained or otherwise accessed the appropriate libraries, the platform can compare the embedding produced for the object from the dataset received from the user with one or more cataloged embeddings included in the one or more libraries to identify a closest cataloged embedding of the one or more cataloged embeddings included in the one or more libraries. For example, as described above, the closest cataloged embedding can be the cataloged embedding with the smallest distance (e.g., L1 distance) to the embedding within the embedding dimensional space.

In some embodiments, when attempting to recognize an object, the platform can process and use data in addition to the provided image(s). In an example embodiment, a dataset received by the platform can also include the current location of the user at the time the images were captured or other context data in addition to the images. This location data can be explicitly provided by the user or user's device or this data can be included as metadata within the image. Further the additional data (e.g., location data or other context data) can be used when determining which libraries to access. As an example, the libraries that are searched against can be selected from the plurality of libraries based at least in part on the current location of the user at the time the one or more images were captured.

Upon identifying the closest cataloged embedding (e.g., recognizing the object), the platform can provide the user with one or more items of user-generated content that are associated with the closest cataloged embedding in the one or more libraries. Thus, the embeddings can be used to recognize the object and access content associated with the recognized object.

Examples of user-generated content can include text annotations, audio annotations, or visual annotations. These items of content can provide a customized experience linking together different users.

As another example, in some embodiments, the user-generated content associated with some of the objects can include an associated virtual layer. In particular, presenting the user-generated content associated with an object to a user can include rendering a virtual layer upon imagery of the object in an augmented reality display. In certain embodiments, the virtual layer does not need a specific augmented reality display and could be incorporated as popup images on a static photograph or a dynamic camera display. Additionally, in some embodiments, the virtual layer can include audio, visual, or audio and visual media.

In some embodiments, the platform might recognize multiple objects in a scene. The platform can visually highlight potential objects that can be selected and interacted with (e.g., provide or receive user-generated content). In some of such embodiments, the platform can perform on-device entity segmentation to recognize the multiple different objects.

In some embodiments, in addition or alternatively to providing the user with one or more items of user-generated content upon identifying the closest cataloged embedding, the platform can provide a signal to one or more additional systems, applications, devices, or other components that identifies the closest cataloged embedding, the object and/or library associated with the closest cataloged embedding, and/or any user-generated content associated with the closest cataloged embedding. Thus, identification of a particular object or embedding as described herein can be used as a signal to various other systems which may perform operations in response to the received information. As one example, if a user has a library of "My Stuff" and the platform recognizes something from that library, the platform may pass a signal along to another system which may use that signal (e.g., along with other signals) to trigger some action or output. For example, if the platform recognizes the user's vehicle from the My Stuff library, the platform can communicate with the user's vehicle (e.g., via a wireless network). As a result, the user's vehicle can unlock its doors, start the engine, adjust seat settings, etc. In some embodiments, communications between the platform and additional systems, applications, devices, or other components can occur using an application programming interface.

In some embodiments of the disclosure, the object recognition and content provisioning platform can be implemented locally on a user's device (e.g., smartphone, tablet, laptop, etc.). For example, a user's device can download one or more object content libraries from a database. The user's device can implement the platform locally to search within the downloaded libraries to identify an object and to provide the content associated with the identified object to the user. Likewise, a user's device can implement the platform locally to catalog an object and its user-generated content into a library, which can then be uploaded to the central database for downloading by other devices. Additionally or alternatively, the platform can be implemented on a server computing device. For example, the searching and cataloging functions can be performed at the server device such that the user's device is responsible only for supplying the imagery to the server and receiving the content from the server for presentation to the user. Regardless of whether the platform is implemented locally or on a server device, the platform can be implemented within the context of a single application or can be provided as a service for a number of different applications or other clients. In addition, content libraries can be downloaded or otherwise accessed from a central database, as described above, and/or can be shared in a peer-to-peer manner so that centralized collection of content data is not required or performed.

In some embodiments of the present disclosure, the platform can communicate using one or more application programming interfaces (APIs). For example, APIs can be used for receiving the image(s) captured by the user and/or for providing the content item. The APIs can be predefined and can enable the platform to have a standardized interface with clients (e.g., various devices and/or applications).

In some embodiments, the computing systems can utilize a database to store information that includes the embeddings and associated user generated content. In an example, the database can be a non-relational database such as a cloud database or NoSQL database which does not include a built-in data hierarchy. However, in other examples, a relational database such as a SQL database can be used. For some embodiments that utilize a non-relational database, the computing systems can also include an algorithm for moving a copy of certain cataloged embeddings and a copy of the associated user generated content from the non-relational database to a temporary database. In these examples, the temporary database can comprise one or more libraries; and the computing systems can access the libraries from the temporary database to identify the closest cataloged embedding.

As an example technical effect and benefit provided by the present disclosure, searching can be limited to a subset of the entire collection of cataloged embeddings. Limiting the search can be conducted at the library level by the user selecting one or more relevant libraries to reduce the number of comparisons to cataloged embeddings. In addition or alternatively, limiting the search can utilize metadata associated with the collection of cataloged embeddings. In some implementations, database engineering can also be applied to pipe relevant data, by copying or moving the data, to a temporary database to limit queries to the subset of embeddings within the temporary database. By limiting the search to a subset of libraries or embeddings, the methods and systems described can save processing power, reduce memory usage, and in some cases be implemented on user devices. Thus, the embodiments described lead to lower power consumption which would save operation costs, and faster identification of related content which would provide a better user experience.

With reference now to the Figures, example embodiments of the present disclosure will be discussed in further detail.

Example Embodiments

FIG. 1A illustrates an example process for retrieving user-generated content. The process utilizes a platform 10 to receive an image 100 and process the image 100 to generate an embedding 101 (e.g., via use of an embedding model 102). The platform 10 then accesses content stored in a plurality of libraries 103 to identify a closest cataloged embedding 104 associated with user-generated content 105.

In certain embodiments, identifying the closest cataloged embedding 104 can utilize a distance within the embedding dimensional space. In an embodiment, the closest cataloged embedding 104 displays the minimum distance to the embedding 101. The platform 10 can then provide the user-generated content 105 as a form of output. Example types of user-generated content 105 can include audio or visual annotation that can be directed to the image 100 as a whole or to an object within the image 100. In some cases the user-generated content 105 can be provided as a virtual layer that is superimposed on the image 100.

Figure 1B:
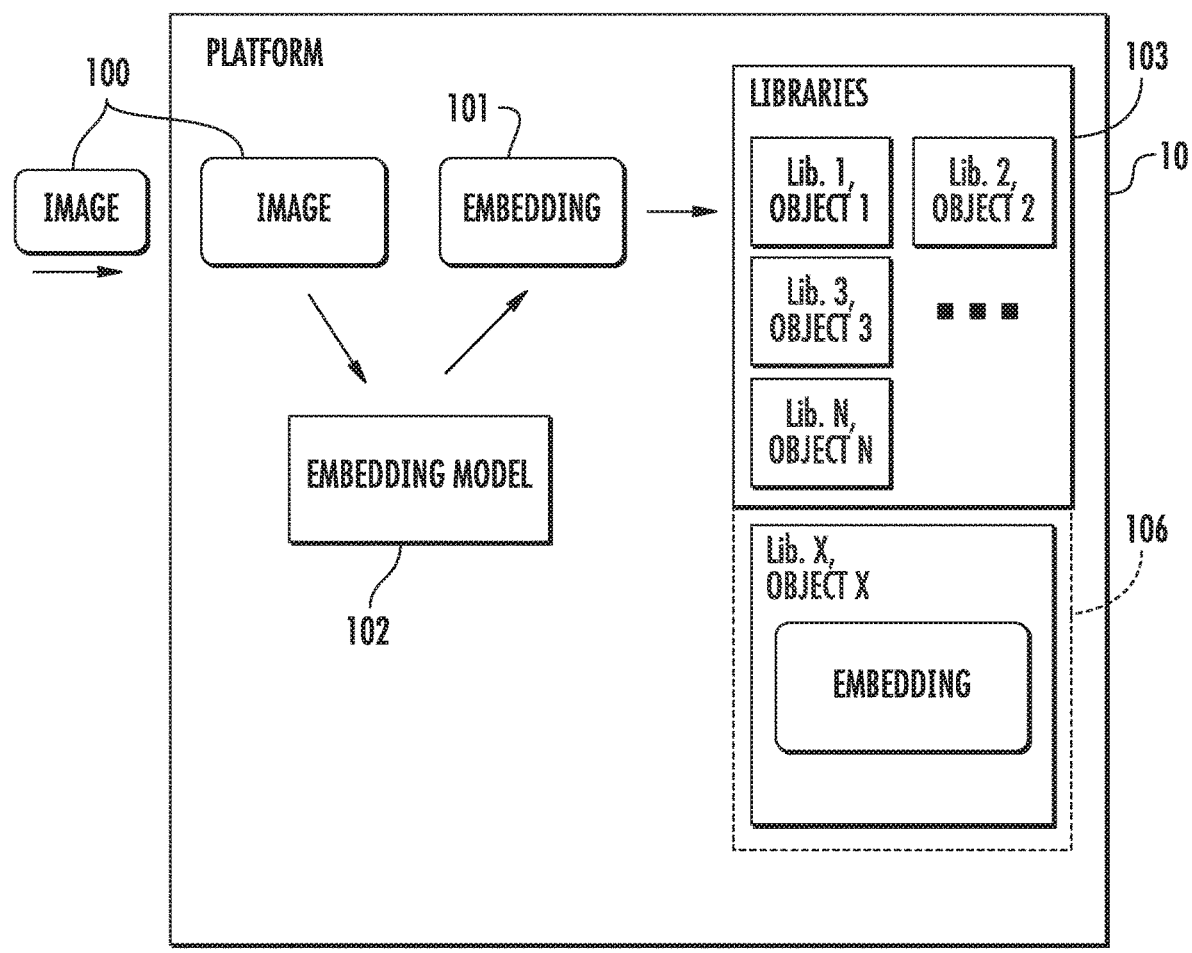
FIG. 1B illustrates a workflow diagram of an example process for cataloging user-generated content according to example embodiments of the present disclosure.

FIG. 1B illustrates an example process for cataloging user-generated content. The process utilizes a platform 10 to receive an image 100 and process the image 100 to generate an embedding 101. The platform 10 then accesses content stored in a plurality of libraries 103. For example, a library may exist for a local natural history museum, a library may exist for mammals, a library may exist for an individual user, and/or libraries may exist for other organizations, categories of objects, etc. The platform 10 associates the embedding 101 with a cataloged object (e.g., an object that belongs to or is a member of a group of objects associated with a local museum or mammals) as part of a library. By this process, the platform 10 can add 106 an embedding 101 as a cataloged embedding to the plurality of libraries 103. While this process illustrates the addition of an embedding, user-generated content may optionally be included or associated with the embedding 101. For these cases, the user generated content can be provided along with the image 100 or it can be provided after the embedding is associated with a library.

In some cases, the platform 10 can add 106 the embedding 101 as a cataloged embedding to an existing library. In some cases, the platform 10 can add 106 the embedding 101 as a cataloged embedding to a new library. In an embodiment, adding an embedding to a library can use only image data, including image metadata. In another embodiment, the process of associating an embedding with a library can use additional data such as user input to determine which library or libraries the embedding should be added to.

Figure 2A:
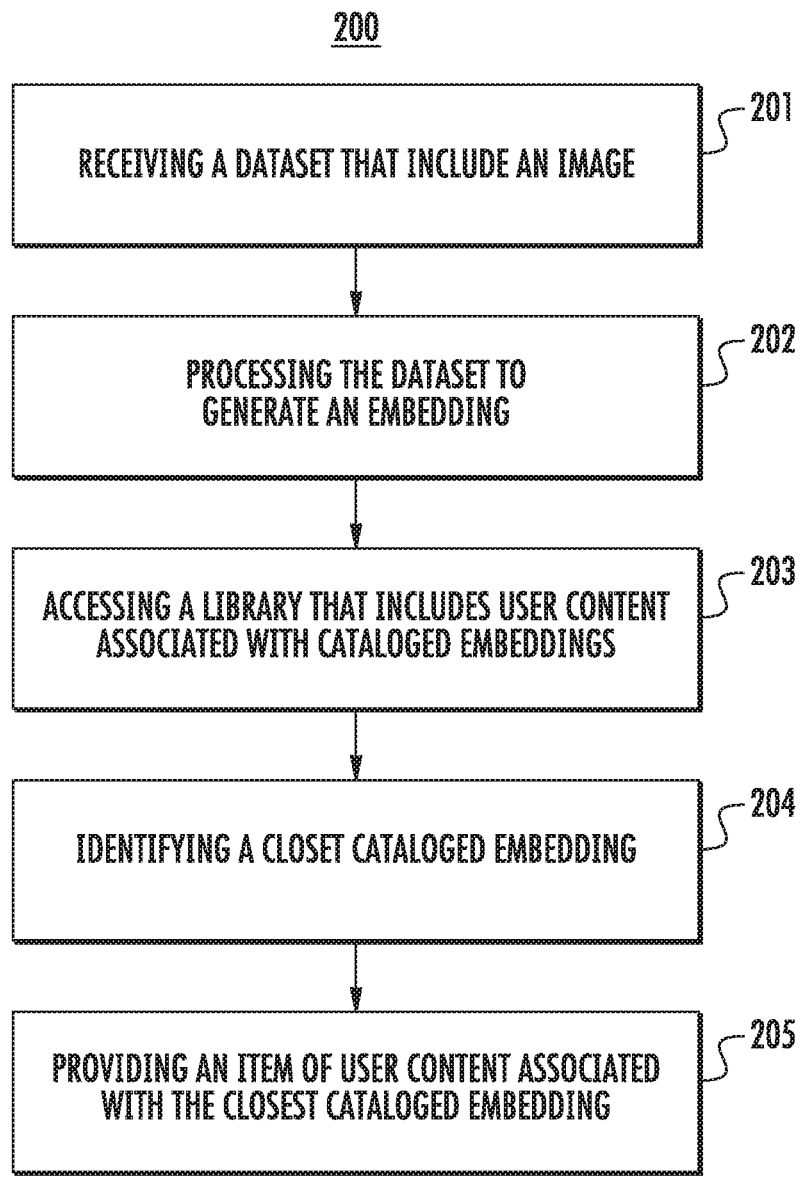
FIG. 2A illustrates a flowchart diagram of an example method for retrieving user-generated content according to example embodiments of the present disclosure.

FIG. 2A illustrates an example method 200 for retrieving user-generated content. Embodiments of the method 200 includes the steps: receiving 201, processing 202, accessing 203, identifying 204, and providing 205. Receiving 201 the dataset can include locally storing the dataset before processing 202 the dataset to generate an embedding. In certain cases, the dataset can be processed in real time (e.g., datasets that include streaming video).

The method 200 also includes processing 202 the dataset to generate an embedding. Processing 202 the dataset can be accomplished using an embedder model. Examples of the embedder model include artificial neural networks such as feed-forward neural networks, recurrent neural networks (e.g., long short-term memory recurrent neural networks), convolutional neural networks, or other forms of neural networks. Additionally, generating the embedding may use one or more of the hidden layers of the artificial neural network to generate the embedding.

The method 200 further includes accessing 203 a library that includes user content associated with cataloged embeddings. For example, accessing 203 a library can include accessing a database containing a plurality of libraries; locating a library from the plurality of libraries; and reading data from the library. In some embodiments, accessing 203 a library can also include downloading a library onto a local device. In some embodiments, accessing 203 a library can include only accessing a subset of libraries from the plurality of libraries. Further, embodiments may include user or system permissions such that accessing a library can be limited by the user or system permission to accessing a subset of the plurality of libraries, a subset of the embeddings or cataloged user data contained in a library, or a combination of both.

The method 200 further includes identifying 204 a closest cataloged embedding. Generally, identifying 204 a closest cataloged embedding can be based at least in part on a comparison of the embedding with one or more cataloged embeddings contained in one or more libraries. In certain embodiments, the comparison can include determining an attribute, such as the distance, as between the embedding and the one or more cataloged embeddings. In an example embodiment, identifying 204 the closest cataloged embedding can include identifying the cataloged embedding having the smallest distance to the embedding within the embedding dimensional space.

The method 200 also includes providing 205 an item of user content associated with the closest cataloged embedding. Generally, providing 205 an item of user content can allow embodiments of the disclosure to produce a customized user experience linking together knowledge an information from platform users. In certain embodiments, providing 205 an item of user content can include a list of content items. For these embodiments, the list of content items can be ordered or identified in a way to demonstrate their relevance to the received image. As an example, a computing system implementing the method receives a picture of a food dish and provides a list of items of user content associated with an identified closest cataloged embedding. The list could be provided as excerpts from each content item, with the most relevant content item having a more prevalent excerpt and the least relevant having less prevalent except. In one example, the food dish is most often identified in restaurants and so the excerpt for restaurants serving the dish is largest. Another example excerpt could include recipes to make the food dish, which may be present in smaller font or in the background.

Figure 2B:
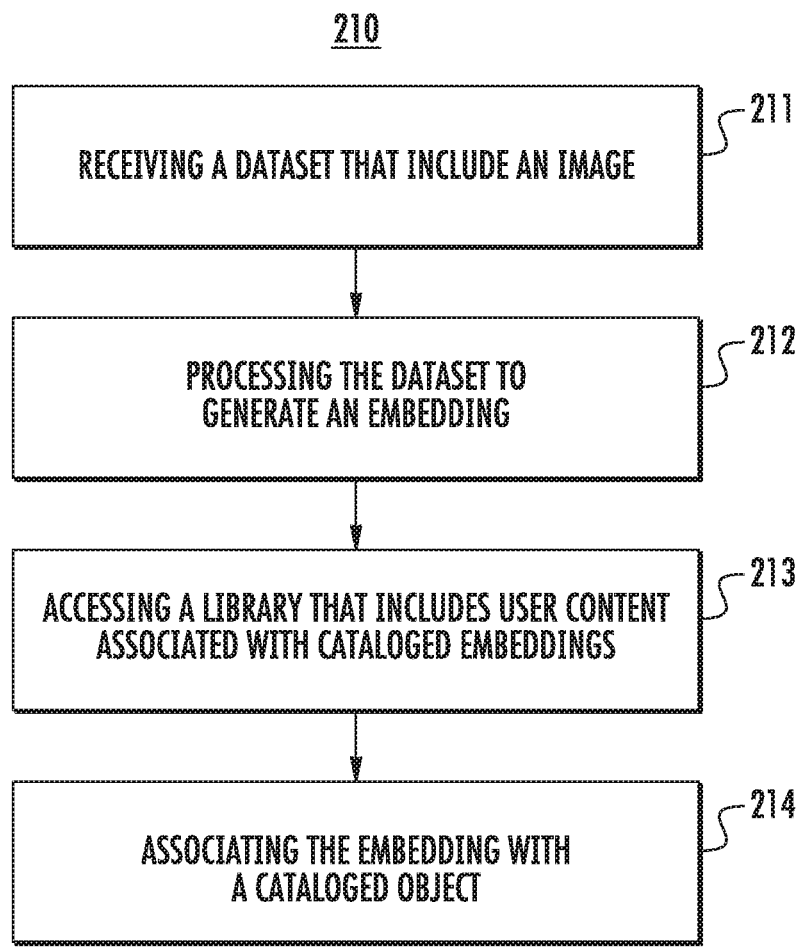
FIG. 2B illustrates a flowchart diagram of an example method for cataloging user-generated content according to example embodiments of the present disclosure.

FIG. 2B illustrates an example method 210 for cataloging user-generated content. The method 210 includes the steps: receiving a dataset that includes an image 211; processing the dataset to generate an embedding 212; accessing a library that includes user content associated with cataloged embeddings 213; and associating the embedding with a cataloged object 214. Generally, cataloging user-generated content includes similar operations to retrieving user-generated content. Several overlapping operations are present in both and each method can be practiced individually or together without deviating from the spirit of embodiments of the disclosure.

Although FIGS. 2A and 2B depict steps performed in a particular order for purposes of illustration and discussion, the methods of the present disclosure are not limited to the particularly illustrated orders or arrangements. The various steps of the methods 200 and 210 can be omitted, rearranged, combined, and/or adapted in various ways without deviating from the scope of the present disclosure.

Figure 3A:
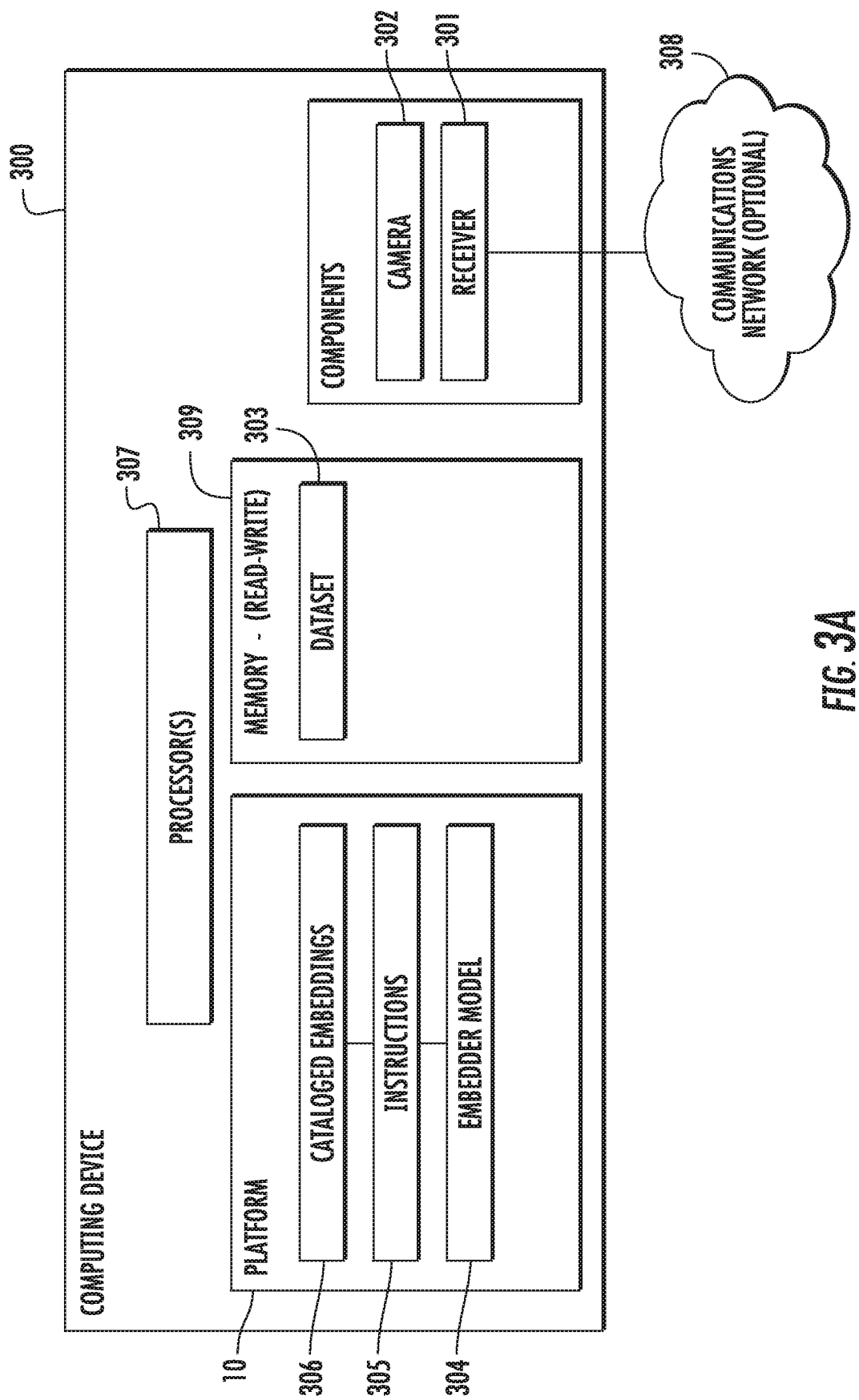
FIG. 3A illustrates a block diagram of an example hardware diagram for a platform run on a computing device according to example embodiments of the present disclosure.

FIG. 3A illustrates an example hardware diagram for a platform 10 run on a computing device 300. The computing device 300 can include one or more processors 307 that can execute computer readable instructions 305 for utilizing components that include a camera 302 and receiver 301. Examples of these instructions include methods for retrieving a dataset 303, processing the dataset 303 using an embedder model 304, and accessing cataloged embeddings 306. In some embodiments, a communications network 308 can provide a conduit for the computing device 300 to receive the dataset 303. Generally, computing devices 300 can include smartphones, tablets, laptops, and desktop computers, as well as other locally or remotely connected devices which could be capable of interacting with a communications network 308. As an example, the computing device 300 can include a smart phone containing a processor 307 as well as the platform 10 as a downloaded application. Upon taking a photo with the smartphone camera 302, the photo can be preprocessed or used as it. The smartphone can access the platform 10 as an application to run the instructions for receiving the photo (image) and processing the photo to generate an embedding. In some computing devices, the platform may perform these steps automatically after the camera is used or any time the camera is in use.

Figure 3B:
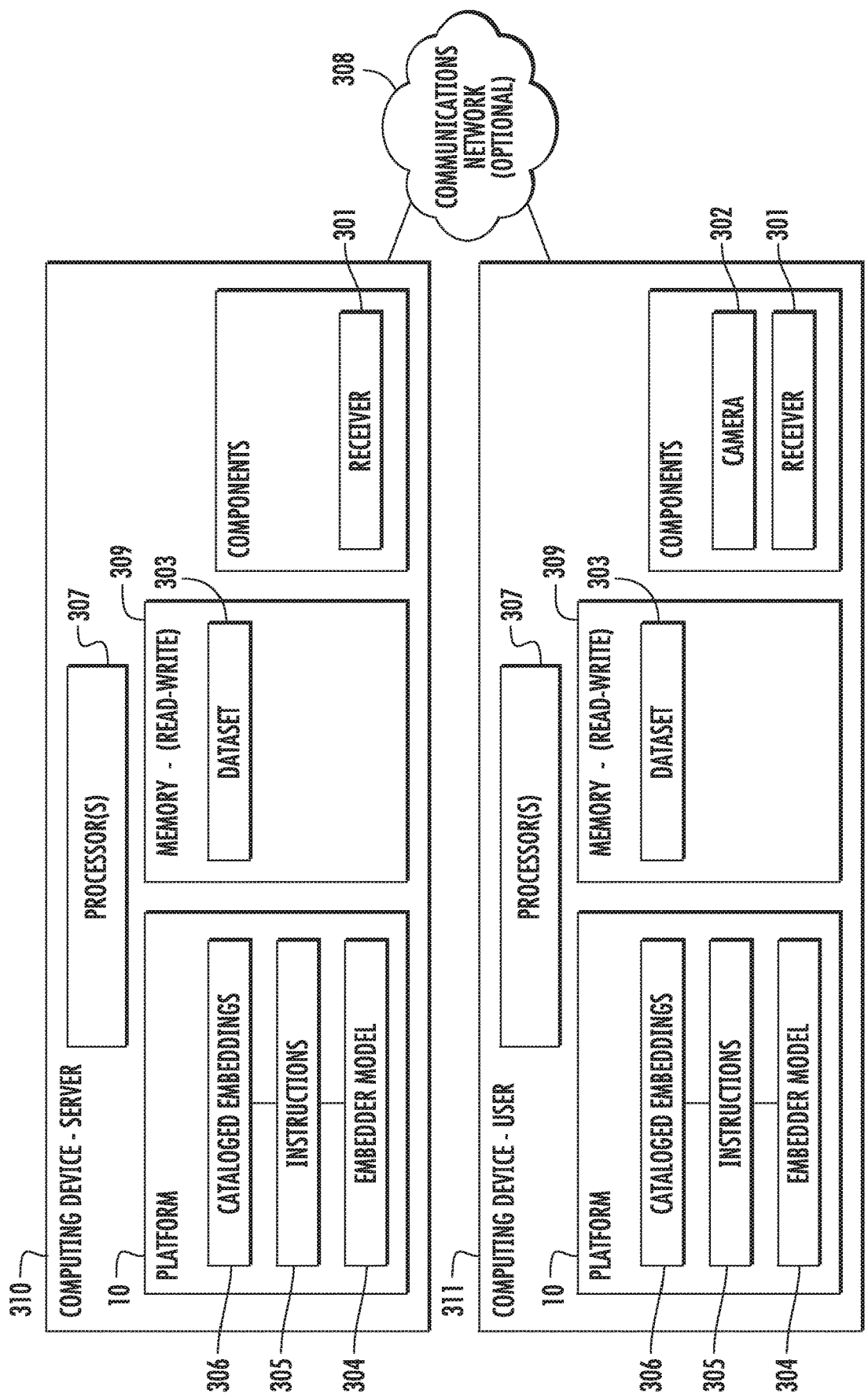
FIG. 3B illustrates a block diagram of an example hardware diagram for a platform run on one or more computing devices that are connected by a communications network according to example embodiments of the present disclosure.

FIG. 3B illustrates an example hardware diagram for a platform 10 run on one or more computing devices that are connected by a communications network 308. Each of the computing devices can include one or more processors 307 that can execute computer readable instructions 305 for utilizing components that include a camera 302 and/or receiver 301. These instructions 305 can also include methods for cataloging and retrieving datasets received by the computing devices.

In an example embodiment, at least two computing devices, a user device 311 and a server device 310 can interact over a communications network 308. The user device 311 and the server device 310 can include a smartphone and a database respectively and the communications network can include the internet. In an embodiment, the server device 310 can include a database containing the plurality of cataloged embeddings 306 and the user device 311 can download a subset of the cataloged embeddings 306 for use with the platform 10.

In another embodiment, the user device 311 can capture an image using the camera 302 and communicate the image as part of a dataset 303 to the server device 310 over a communications network 308. The server device 310 can utilize a receiver 301 to handle the dataset 303 and can write the dataset 303 to memory 309. Additionally, the server can include a database of cataloged embeddings. Upon receiving the dataset 303, the platform 10 can execute instructions 305 to use an embedder model 304 to process the dataset 303 and access the database of cataloged embeddings to identify a closest cataloged embedding as well as user-generated content associated with the closest cataloged embedding. Some of this information can be transmitted to the user device 311 receiver 301 over the communications network 308. At the user device, the platform can execute instructions 305 for providing the user-generated content. Providing the user generated content can utilize an API to access user device 311 components such as the camera 302. As a non-limiting example, the API could provide the user-generated content as a virtual layer superimposed on the camera image.

Generally, computing devices, such as the user computing device as shown in FIG. 3B, can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

In embodiments of the disclosure that implement computing devices 300, the computing device 300 can include one or more processors 307 and a memory 309. The one or more processors 307 can be any suitable processing device (e.g., a processor core, a microprocessor, an ASIC, a FPGA, a controller, a microcontroller, etc.) and can be one processor or a plurality of processors that are operatively connected. The memory 309 can include one or more non-transitory computer-readable storage mediums, such as RAM, ROM, EEPROM, EPROM, flash memory devices, magnetic disks, etc., and combinations thereof. The memory 309 can be delocalized and can include instructions 305 which are executed by the processor 307 to cause the computing device 300 to perform operations.

In some implementations, the user computing device 311 can store or include one or more embedder models 304. For example, the embedder models 304 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more embedder models 304 can be received from the server computing device over communications network 308, stored in the user computing device memory, and then used or otherwise implemented by the one or more processors 307. In some implementations, the user computing device can implement multiple parallel instances of an embedder model 304.

More particularly, the embedder model 304 can access the cataloged embeddings 306 and the associated objects located on one or more computing devices 300 to train the embedder model 304. In some embodiments, the cataloged embeddings 306 can include a subset of training embeddings that are associated with a known object(s). Generally, this training data provides a system for supervised learning that could be incorporated with an artificial neural network such as a convolutional neural network or a recurrent neural network to train the embedder model 304. As the number of cataloged embeddings 306 increases from the association of new embeddings, an embodiment of this method 210 is shown in FIG. 2B, the embedder model can be configured to adopt some or all the new data into the training algorithm. Alternatively, some embodiments of the disclosure may utilize only a static set of training data. In particular, generating an embedding from an image may utilize any dimensional reduction technique for mapping the image to an N-dimensional space of discrete values. As an example, a hidden layer of an artificial neural network can be used to generate the embedding. In some embodiments, the embedding may be produced from a single hidden layer; in other embodiments, the embedding may be produced from an average of one or more hidden layers; in certain embodiments, the embedding may be produced from an average of one or more hidden layers, where each hidden layer was generated from a different image of the same object. In any of the embodiments, the embedder model may also incorporate additional data from the dataset. For example, image location and/or user annotation may be used as additional input to the embedder model. In sum, embodiments of the disclosure can provide embedder models for mapping a dataset that includes an image to an N-dimensional space that clusters embeddings generated from images that display similar features or objects.

Additionally or alternatively, one or more embedder models 304 can be included in or otherwise stored and implemented by the server computing device that communicates with the user computing device according to a client-server relationship. For example, the embedder models 304 can be implemented by the server computing device as a portion of a web service. Thus, one or more embedder models 304 can be stored and implemented at the user computing device and/or one or more embedder models 304 can be stored and implemented at the server computing device.

The user computing device can also include one or more user input component that receives user input, such as a receiver 301. For example, the user input component or receiver can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input. The input component may also recognize hand gestures or pupil tracking as a mechanism for received input.

The server computing device includes one or more processors 307 and memory. The one or more processors 307 can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store a dataset 303 and instructions 305 which are executed by the processor 307 to cause the server computing device to perform operations.

In some implementations, the server computing device includes or is otherwise implemented by one or more server computing devices. In instances in which the server computing device includes plural server computing devices, such server computing devices can operate according to sequential computing architectures, parallel computing architectures, or some combination thereof.

As described above, the server computing device can store or otherwise include one or more machine-learned embedder models 304. For example, the models 304 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device and/or the server computing device can train the models 304 via interaction with the cataloged embeddings 306 which can include training data as part of a training library that is updated over some periodic time. A training computing system can be implemented separate from the server computing device or can be a portion of the server computing device.

Embodiments of the disclosure may include training systems on the computing device 300 or that can be accessed through the communications network 308. The training computing system can include one or more processors 307 and a memory 309. The one or more processors 307 can be any suitable processing device (e.g., a processor core, a microprocessor, an ASIC, a FPGA, a controller, a microcontroller, etc.) and can be one processor or a plurality of processors that are operatively connected. The memory 309 can include one or more non-transitory computer-readable storage mediums, such as RAM, ROM, EEPROM, EPROM, flash memory devices, magnetic disks, etc., and combinations thereof. The platform 10 can include instructions 305 which are executed by the processor 307 to cause the training computing system to perform operations. In some implementations, the training computing system includes or is otherwise implemented by one or more server computing devices.

The training computing system can include a model trainer that trains the machine-learned embedder model 304 stored at the user computing device 311 and/or the server computing device 310 using various training or learning techniques, such as, for example, backwards propagation of errors. In some implementations, performing backwards propagation of errors can include performing truncated backpropagation through time. The model trainer can perform a number of generalization techniques (e.g., weight decays, dropouts, etc.) to improve the generalization capability of the models being trained.

In particular, the model trainer can train the embedder model 304 based on a set of training data that can include all or a subset of the cataloged embeddings 306. The training data can include, for example, an object category (e.g., animals, food, plants, art, etc.) and several images that are representative of the category.

In some implementations, if the user has provided consent, the training examples can be provided by the user computing device 311. Thus, in such implementations, the model 304 provided to the user computing device 311 can be trained by the training computing system on user-specific data received from the user computing device 311. In some instances, this process can be referred to as personalizing the model. In some implementations, the system and/or model trainer can leverage federated learning techniques to help bootstrap global models from private local models in a privacy-preserving way.

The model trainer includes computer logic utilized to provide desired functionality. The model trainer can be implemented in hardware, firmware, and/or software controlling a general purpose processor. For example, in some implementations, the model trainer includes program files stored on a storage device, loaded into a memory and executed by one or more processors. In other implementations, the model trainer includes one or more sets of computer-executable instructions that are stored in a tangible computer-readable storage medium such as RAM hard disk or optical or magnetic media.

The communications network 308 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 3A illustrates one example computing device 300 that can be used to implement the present disclosure. Other computing devices 300 can be used as well. For example, in some implementations, a user computing device 311 can include the embedder model 304 and the cataloged embeddings 306. In such implementations, the models can be both trained and used locally at the user computing device 311. In some of such implementations, the user computing device 311 can implement the model trainer 304 to personalize the models based on user-specific data.

FIGS. 3A and 3B depicts block diagrams of an example computing device 300 or devices that perform according to example embodiments of the present disclosure. The computing device 300 can be a user computing device 311 or a server computing device 310.

The computing device 300 can include a number of applications (e.g., applications 1 through N). Each device can contain its own machine learning library and machine-learned model(s). For example, each device can include an embedder model. Additional applications can include a text messaging application, a dictation application, a virtual keyboard application, a browser application, etc.

As illustrated in FIG. 3B, the platform 10 can include instructions 305 for communicating with a number of other components of the computing device, such as, for example, a camera 302 and a receiver 301. In some embodiments, the components can also include one or more sensors, a context manager, a device state component, and/or additional components. In some implementations, the platform 10 can communicate with each device component using an API (e.g., a public API). In some implementations, the API used by each application is specific to that application. In some implementations, the API can communicate with each application using a common API or can communicate with a device manager to determine component specific instructions (e.g., a common API across all applications).

Figure 4:
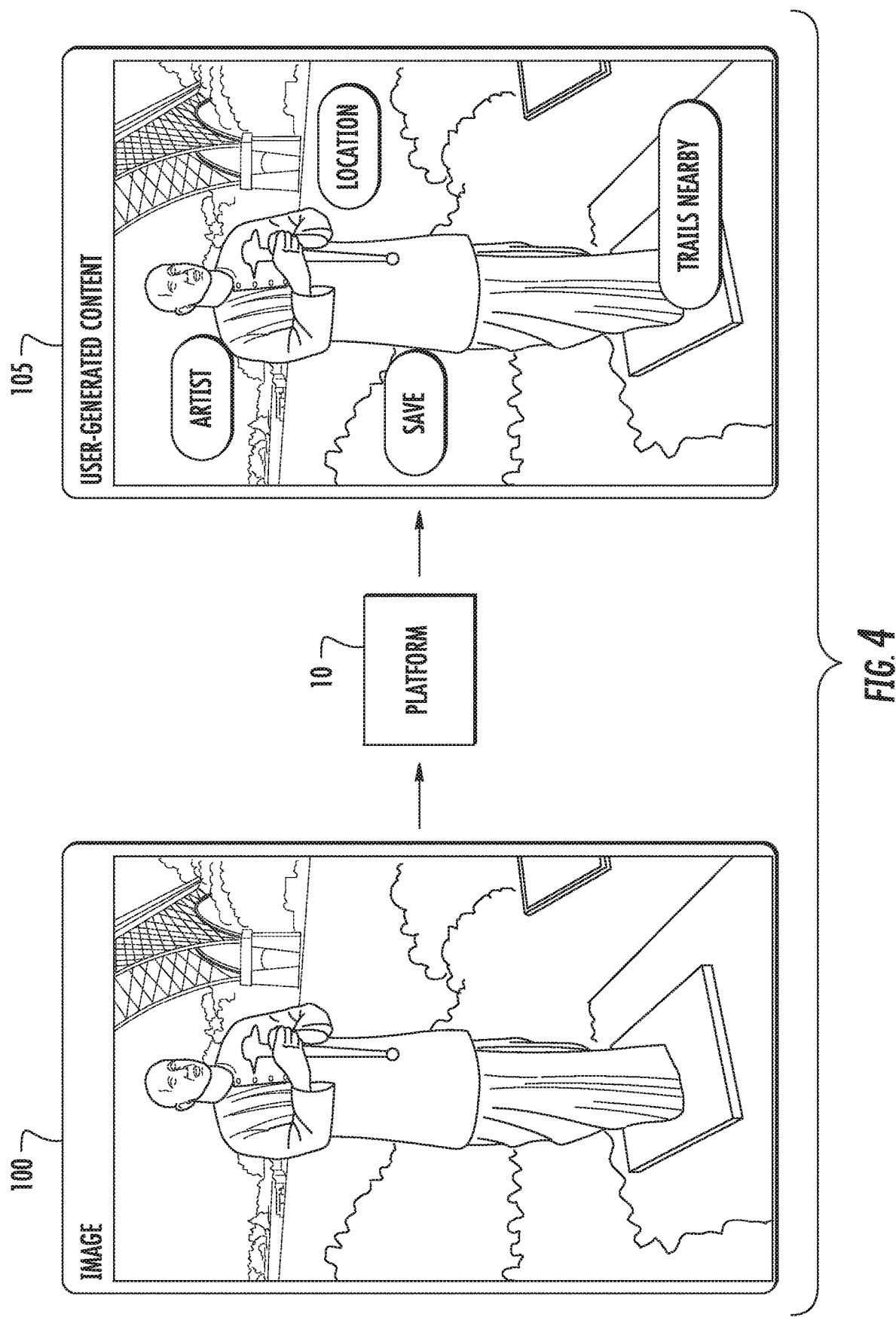
FIG. 4 illustrates a graphical diagram of an example use for the platform according to example embodiments of the present disclosure.

FIG. 4 illustrates a real-world example use for the platform. As shown, the platform 10 can receive an image 100, and in certain implementations, the platform 10 can identify the image 10 as including a sculpture and further provide relevant user-generated content 105 related to the sculpture. In some instances, the platform 10 can also identify a location from the image or from metadata and also provide relevant user-generated content 105 related to the location.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for cataloging and retrieving user-generated data associated with objects, the computing system comprising:
   one or more processors; and
   one or more non-transitory computer-readable media that collectively store instruction that, when executed by the one or more processors, cause the computing system to perform operations, the operations comprising:
      receiving a dataset that comprises a plurality of images captured by the user that depict the object;
      processing, using an artificial neural network, the dataset to generate an embedding associated with the object, wherein processing the dataset comprises:
         respectively processing, using the artificial neural network, the plurality of images to respectively generate a plurality of embeddings for the object; and
         aggregating the plurality of embeddings to generate the embedding associated with the object;
      accessing one or more libraries of a plurality of libraries of user-generated content, wherein each of the plurality of libraries comprises one or more cataloged embeddings respectively associated with one or more cataloged objects, wherein each cataloged embedding has been generated from one or more images of the associated cataloged object captured by one or more other users, wherein one or more items of user-generated content are associated with each cataloged object, and wherein the one or more libraries are a subset of the plurality of libraries;

identifying, based at least in part on a comparison of the embedding with one or more cataloged embeddings included in the one or more libraries, a closest cataloged embedding of the one or more cataloged embeddings included in the one or more libraries; and providing, for presentation to the user, at least one item of user-generated content that is associated with the closest cataloged embedding of the one or more cataloged embeddings included in the one or more libraries.

2. The computing system of claim 1, wherein:

receiving the dataset that comprises the plurality of images comprises receiving, via a pre-defined application programming interface, the dataset that comprises the one or more images; and providing the at least item of user-generated content associated with the closest cataloged embedding comprises providing, via the pre-defined application programming interface, the at least item of user-generated content associated with the closest cataloged embedding for presentation to the user.

3. The computing system of claim 1, wherein:

the dataset further comprises data descriptive of a current location of the user at a time the plurality of images were captured; and accessing the one or more libraries of the plurality of libraries comprises selecting the one or more libraries from the plurality of libraries based at least in part on the current location of the user at the time the plurality of images were captured.

4. The computing system of claim 1, wherein the dataset comprises a video stream and the computing system performs the operations in real-time as the video stream is being captured.

5. The computing system of claim 1, wherein the at least one item of user-generated content that is associated with the closest cataloged embedding comprises a virtual layer to be rendered upon imagery of the object in an augmented reality display.

6. The computing system of claim 1, wherein the at least one item of user-generated content that is associated with the closest cataloged embedding comprises one or more of: a textual annotation, audio annotation, or a visual annotation supplied by one of the other users.

7. The computing system of claim 1, wherein accessing the one or more libraries of the plurality of libraries of user-generated content comprises:

receiving a user input that selects the one or more libraries of the plurality of libraries of user-generated content; and in response to the user input, accessing the one or more libraries from a data storage location.

8. The computing system of claim 1, wherein:

the plurality of libraries of user-generated content are respectively associated with the plurality of other users and each of the other users is able to control a set of access permissions for the respective library associated with such other user; and accessing the one or more libraries of the plurality of libraries of user-generated content comprises accessing only libraries for which the user has been granted permission to access.

9. The computing system of claim 1, wherein:

the one or more processors and the one or more non-transitory computer-readable media are included in one or more server computing devices that implement a user-generated content platform that serves user-generated content to a plurality of client devices that are physically distinct from the one or more server computing devices;

receiving the dataset that comprises the plurality of images comprises receiving, from a user computing device associated with the user via a communications network, the dataset that comprises the plurality of images that were captured by the user computing device; and providing the at least item of user-generated content associated with the closest cataloged embedding comprises providing, to the user computing device via the communications network, the at least item of user-generated content associated with the closest cataloged embedding for presentation to the user by the user computing device.

10. The computing system method of claim 1, wherein the one or more processors and the one or more non-transitory computer-readable media are included in a user computing device that implements an on-device user-generated content platform that serves, via an application programming interface, user-generated content to one or more client applications included on the user computing device that are distinct and separate from the on-device user-generated content platform.

11. The computing system method of claim 1, wherein the one or more processors and the one or more non-transitory computer-readable media are included in a user computing device that implements an application that includes an on-device user-generated content platform that serves user-generated content to the application.

12. The computing system method of claim 11, wherein accessing one or more libraries of a plurality of libraries of user-generated content further comprises downloading at least one of the one or more libraries to the user computing device.

13. The computing system method of claim 1, wherein identifying the closest cataloged embedding comprises searching a hierarchical database, wherein the hierarchical database includes the cataloged embeddings.

14. The computing system method of claim 1, wherein processing the dataset to generate the embedding associated with the object comprises using an object-class-specific embedding model to generate the embedding, wherein the object-class-specific embedding model is specific to a class of the object.

15. A computer implemented method for cataloging and retrieving user-generated data associated with objects, the method comprising:

receiving, by one or more computing devices, a dataset that comprises plurality of images captured by a user that depict an object;

processing, by one or more computing devices using an artificial neural network, the dataset to generate an embedding associated with the object, wherein processing the dataset comprises:

respectively processing, using the artificial neural network, the plurality of images to respectively generate a plurality of embeddings for the object; and aggregating the plurality of embeddings to generate the embedding associated with the object;

accessing, by the one or more computing devices, one or more libraries of a plurality of libraries, wherein each of the plurality of libraries comprises one or more cataloged embeddings respectively associated with one or more cataloged objects, wherein each cataloged embedding has been generated from one or more images of the associated cataloged object; wherein one or more items of content are associated with each embedding, and wherein the one or more libraries are a subset of the plurality of libraries; and associating, by one or more computing devices, the embedding with one of the cataloged objects, wherein associating the embedding with one of the cataloged objects produces a new cataloged embedding that is accessible by the one or more computing devices.

16. The computer implemented method of claim 15, wherein the one or more computing devices comprise a user device, and wherein at least one of the actions of receiving, processing, accessing, and associating are performed on the user device.

17. The computer implemented method of claim 15, further comprising detecting, by one or more computing devices, an item of inappropriate content using a Spam filter.

18. The computer implemented method of claim 15, wherein associating the embedding with one of the cataloged objects comprises searching a hierarchical database, and wherein the hierarchical database includes the cataloged embeddings.

19. A computing system, comprising:

one or more data storage devices that store a plurality of libraries of user-generated content, wherein each of the plurality of libraries comprises one or more cataloged embeddings respectively associated with one or more cataloged objects, wherein each cataloged embedding has been generated from one or more images of the associated cataloged object captured by one or more users, wherein one or more items of user-generated content are associated with each embedding; and one or more computing devices that implement a user-generated content platform that:

receives imagery of an object from a client, wherein the imagery comprises a plurality of images captured by the user that depict the object;

uses an artificial neural network to generate an embedding for the object, wherein generating the embedding comprises:

respectively processing, using the artificial neural network, the plurality of images to respectively generate a plurality of embeddings for the object; and aggregating the plurality of embeddings to generate the embedding associated with the object;

searches one or more of the plurality of libraries to identify a cataloged object that has a cataloged embedding that is closest to the embedding for the object; and serves to the client at least one item of user-generated content associated with the identified cataloged object.

\* \* \* \* \*